United States Patent
Abedini et al.

(10) Patent No.: US 9,615,340 B2
(45) Date of Patent: Apr. 4, 2017

(54) MONITORING PERIODS FOR DEVICE-TO-DEVICE SYNCHRONIZATION SIGNALS

(71) Applicant: QUALCOMM Incorporated, San Diego, CA (US)

(72) Inventors: Navid Abedini, Raritan, NJ (US); Saurabha Rangrao Tavildar, Jersey City, NJ (US); Kapil Gulati, Long Branch, NJ (US); Sudhir Kumar Baghel, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 14/752,089

(22) Filed: Jun. 26, 2015

(65) Prior Publication Data

US 2016/0021626 A1    Jan. 21, 2016

Related U.S. Application Data

(60) Provisional application No. 62/027,124, filed on Jul. 21, 2014.

(51) Int. Cl.
*H04W 56/00*        (2009.01)
*H04W 72/04*        (2009.01)

(52) U.S. Cl.
CPC ......... *H04W 56/00* (2013.01); *H04W 56/002* (2013.01); *H04W 72/04* (2013.01)

(58) Field of Classification Search
CPC .... H04W 56/00; H04W 56/002; H04W 72/04
USPC ....................................................... 370/328
See application file for complete search history.

(56) References Cited

U.S. PATENT DOCUMENTS

2016/0021625 A1 *   1/2016  Li ................. H04W 72/1289
                                                             370/336

FOREIGN PATENT DOCUMENTS

EP          1303152 A1      4/2003

OTHER PUBLICATIONS

IPEA/EPO, Second Written Opinion of the International Preliminary Examining Authority, Int'l Appl. No. PCT/US2015/038305, Jun. 20, 2016, European Patent Office, Munich, DE, 5 pgs.
3GPP, "3rd Generation Partnership Project; Technical Specification Group Radio Access Network; Study on LTE Device to Device Proximity Services; Radio Aspects (Release 12)," 3GPP TR 36.843 v1.2.0 (Feb. 2014) Technical Report, Feb. 2014, pp. 1-40, 3rd Generation Partnership Project.

(Continued)

*Primary Examiner* — Ronald B Abelson
(74) *Attorney, Agent, or Firm* — Holland & Hart LLP

(57) ABSTRACT

Methods, systems, and devices are described for determining a monitoring schedule for device-to-device (D2D) synchronization signals. A synchronization cycle may be determined that includes a plurality of monitoring periods. The monitoring periods may be a time between at least two start times of sequential D2D synchronization signals to detect at least one of the D2D synchronization signals. Sub-monitoring periods may be determined based on the duration of the monitoring periods. The sub-monitoring periods may have a cumulative duration the same as the duration of the monitoring period and be scheduled to occur during different monitoring periods of the synchronization cycle.

30 Claims, 9 Drawing Sheets

(56) References Cited

OTHER PUBLICATIONS

ISA/EPO, International Search Report and Written Opinion of the International Searching Authority, Int'l Appl. No. PCT/US2015/038305, Sep. 23, 2015, European Patent Office, Rijswijk, NL, 11 pgs.
ZTE, "Resource Allocation for Synchronization Signal and Channel," R1-142235, 3GPP TSG-RAN WG1 #77, Seoul, Korea, May 19-23, 2014, 5 pgs., 3rd Generation Partnership Project.

* cited by examiner

MONITORING PERIODS FOR DEVICE-TO-DEVICE SYNCHRONIZATION SIGNALS

CROSS REFERENCES

The present application for patent claims priority to U.S. Provisional Patent Application No. 62/027,124 by Abedini et al., entitled "Monitoring Periods for Device-to-Device Synchronization Signals," filed Jul. 21, 2014, assigned to the assignee hereof, and expressly incorporated by reference herein.

FIELD OF THE DISCLOSURE

The present disclosure, for example, relates to wireless communication systems, and more particularly to monitoring periods for device-to-device (D2D) synchronization signals.

DESCRIPTION OF RELATED ART

Wireless communications systems are widely deployed to provide various types of communication content such as voice, video, packet data, messaging, broadcast, and so on. The wireless communications systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communications system may include a number of base stations, each simultaneously supporting communication for multiple mobile devices (e.g., user equipments (UEs)). Base stations may communicate with UEs on downstream and upstream links. Each base station has a coverage range, which may be referred to as the coverage area of the cell. Device-to-device (D2D) communications involve direct wireless communications between UEs either within or beyond the coverage area of a base station. In some cases, D2D communications are utilized by public safety officers such as police, fire and rescue teams, for example. In some cases, D2D communications may be between UEs in differing coverage areas and/or having different service providers.

A UE may periodically send D2D synchronization signal(s) (D2DSS) on a repeating schedule to provide for detection and synchronization with other UEs for D2D communications. For example, a UE may cease all other activities (e.g., data communications, transmitting its own D2DSS, etc.) to monitor for the D2DSS from other UEs. The monitoring period may be the same length as the schedule of the periodic synchronization signal transmissions to ensure receipt. This extended interruption in services, however, may result in communication loss.

SUMMARY

The described features generally relate to one or more improved systems, methods, and/or apparatuses for determining monitoring periods for device-to-device synchronization signal(s) (D2DSS) that may avoid the extended interruption. According to various examples, a device may determine a cycle for D2DSS transmissions, e.g., the repeating schedule the source device sends the D2DSS transmissions. The synchronization cycle may cover a time period where several D2DSS are transmitted. The device may determine a monitoring period having a duration that ensures detection of at least one transmission of a D2DSS. The monitoring period may have a duration spanning a start time for two sequential transmissions of a D2DSS, for example. The device may also determine sub-monitoring periods to monitor for at least one transmission of the D2DSS. The cumulative duration of the sub-monitoring periods may be the same duration as the monitoring period. The device may monitor for the D2DSS during the sub-monitoring periods over the course of several monitoring periods occurring during the synchronization cycle to reduce the extended interruption in services.

In a first illustrative set of examples, a method for wireless communications is provided. The method may include: determining a synchronization cycle that comprises one or more device-to-device (D2D) synchronization signals transmitted on a periodic schedule from a D2D source; determining a monitoring period based at least in part on a start time for at least two sequential transmissions of the D2D synchronization signals occurring during the synchronization cycle based at least in part on the periodic schedule, wherein a duration of the synchronization cycle comprises a plurality of monitoring periods; determining, based at least in part on a duration of the monitoring period, a plurality of sub-monitoring periods, wherein a cumulative duration of the plurality of sub-monitoring periods is the same as the duration of the monitoring period; and monitoring, based at least in part on the plurality of sub-monitoring periods, for at least one of the one or more D2D synchronization signals.

In some aspects, each of the plurality of sub-monitoring periods may include a sub-monitoring duration, each sub-monitoring duration being the same length. Each of the plurality of sub-monitoring periods may include a sub-monitoring duration, at least two of the sub-monitoring durations being a different length. Determining the plurality of sub-monitoring periods may include scheduling the plurality of sub-monitoring periods to occur during a portion of the monitoring periods occurring during a synchronization cycle, wherein each of the plurality of sub-monitoring periods are scheduled during a different monitoring period.

In some aspects, the plurality of sub-monitoring periods are scheduled during different monitoring periods for each synchronization cycle. The plurality of sub-monitoring periods may be scheduled during the same monitoring periods for each synchronization cycle. A time block of each scheduled sub-monitoring period may be determined based at least in part on one or more of an identification of the D2D source and a D2D subframe number.

In some aspects, determining the plurality of sub-monitoring periods may include scheduling at least one of the plurality of sub-monitoring periods to occur during each monitoring period during the synchronization cycle, wherein each of the plurality of sub-monitoring periods are scheduled during a different monitoring period. Each of the plurality of sub-monitoring periods may be scheduled sequentially. Scheduling the plurality of sub-monitoring periods sequentially may include scheduling a first sub-monitoring period during a first time block of a first monitoring period; and scheduling a second sub-monitoring period during a second time block of a second monitoring period, the second time block of the second monitoring period being adjacent to a first time block of the second monitoring period.

In some aspects, each of the plurality of sub-monitoring periods may be scheduled non-sequentially. Scheduling the plurality of sub-monitoring periods non-sequentially may include: scheduling a first sub-monitoring period during a first time block of a first monitoring period; and scheduling a second sub-monitoring period during a second time block of a second monitoring period, the second time block of the second monitoring period being non-adjacent to a first time block of the second monitoring period.

In some aspects, a time block of each scheduled sub-monitoring period may be determined based at least in part on one or more of an identification of the D2D source and a D2D subframe number.

In a second illustrative set of examples, an apparatus for wireless communications is provided. The apparatus may include: a processor; memory in electronic communication with the processor; and instructions being stored in the memory, the instructions being executable by the processor. The instructions may be executable by the processor to: determine a synchronization cycle that may include one or more D2D synchronization signals transmitted on a periodic schedule from a D2D source; determine a monitoring period based at least in part on a start time for at least two sequential transmissions of the D2D synchronization signals occurring during the synchronization cycle based at least in part on the periodic schedule, wherein a duration of the synchronization cycle may include a plurality of monitoring periods; determine, based at least in part on a duration of the monitoring period, a plurality of sub-monitoring periods, wherein a cumulative duration of the plurality of sub-monitoring periods is the same as the duration of the monitoring period; and monitor, based at least in part on the plurality of sub-monitoring periods, for at least one of the one or more D2D synchronization signals.

In some aspects, each of the plurality of sub-monitoring periods may include a sub-monitoring duration, each sub-monitoring duration being the same length. Each of the plurality of sub-monitoring periods may include a sub-monitoring duration, at least two of the sub-monitoring durations being a different length. The instructions to determine the plurality of sub-monitoring periods may be further executable by the processor to schedule the plurality of sub-monitoring periods to occur during a portion of the monitoring periods occurring during a synchronization cycle, wherein each of the plurality of sub-monitoring periods are scheduled during a different monitoring period.

In some aspects, the plurality of sub-monitoring periods may be scheduled during different monitoring periods for each synchronization cycle. The plurality of sub-monitoring periods may be scheduled during the same monitoring periods for each synchronization cycle. A time block of each scheduled sub-monitoring period may be determined based at least in part on one or more of an identification of the D2D source and a D2D subframe number.

In some aspects, the instructions to determine the plurality of sub-monitoring periods may be further executable by the processor to schedule at least one of the plurality of sub-monitoring periods to occur during each monitoring period during the synchronization cycle, wherein each of the plurality of sub-monitoring periods are scheduled during a different monitoring period. Each of the plurality of sub-monitoring periods may be scheduled sequentially. The instructions to schedule the plurality of sub-monitoring periods sequentially may be further executable by the processor to: schedule a first sub-monitoring period during a first time block of a first monitoring period; and schedule a second sub-monitoring period during a second time block of a second monitoring period, the second time block of the second monitoring period being adjacent to a first time block of the second monitoring period.

In some aspects, each of the plurality of sub-monitoring periods may be scheduled non-sequentially. The instructions to schedule the plurality of sub-monitoring periods non-sequentially may be further executable by the processor to: schedule a first sub-monitoring period during a first time block of a first monitoring period; and schedule a second sub-monitoring period during a second time block of a second monitoring period, the second time block of the second monitoring period being non-adjacent to a first time block of the second monitoring period. A time block of each scheduled sub-monitoring period may be determined based at least in part on one or more of an identification of the D2D source and a D2D subframe number.

In a third illustrative set of examples, an apparatus for wireless communications is provided. The apparatus may include: means for determining a synchronization cycle that may include one or more D2D synchronization signals transmitted on a periodic schedule from a D2D source; means for determining a monitoring period based at least in part on a start time for at least two sequential transmissions of the D2D synchronization signals occurring during the synchronization cycle based at least in part on the periodic schedule, wherein a duration of the synchronization cycle may include a plurality of monitoring periods; means for determining, based at least in part on a duration of the monitoring period, a plurality of sub-monitoring periods, wherein a cumulative duration of the plurality of sub-monitoring periods is the same as the duration of the monitoring period; and means for monitoring, based at least in part on the plurality of sub-monitoring periods, for at least one of the one or more D2D synchronization signals.

In some aspects, each of the plurality of sub-monitoring periods may include a sub-monitoring duration, each sub-monitoring duration being the same length. Each of the plurality of sub-monitoring periods may include a sub-monitoring duration, at least two of the sub-monitoring durations being a different length. The means for determining the plurality of sub-monitoring periods may include means for scheduling the plurality of sub-monitoring periods to occur during a portion of the monitoring periods occurring during a synchronization cycle, wherein each of the plurality of sub-monitoring periods are scheduled during a different monitoring period.

In some aspects, the plurality of sub-monitoring periods may be scheduled during different monitoring periods for each synchronization cycle. The plurality of sub-monitoring periods may be scheduled during the same monitoring periods for each synchronization cycle. A time block of each scheduled sub-monitoring period may be determined based at least in part on one or more of an identification of the D2D source and a D2D subframe number. The means for determining the plurality of sub-monitoring periods may include means for scheduling at least one of the plurality of sub-monitoring periods to occur during each monitoring period during the synchronization cycle, wherein each of the plurality of sub-monitoring periods are scheduled during a different monitoring period.

In some aspects, each of the plurality of sub-monitoring periods may be scheduled sequentially. Scheduling the plurality of sub-monitoring periods sequentially may include means for scheduling a first sub-monitoring period during a first time block of a first monitoring period; and means for scheduling a second sub-monitoring period during a second time block of a second monitoring period, the second time block of the second monitoring period being adjacent to a first time block of the second monitoring period.

In some aspects, each of the plurality of sub-monitoring periods may be scheduled non-sequentially. Scheduling the plurality of sub-monitoring periods non-sequentially may include: means for scheduling a first sub-monitoring period during a first time block of a first monitoring period; and means for scheduling a second sub-monitoring period during a second time block of a second monitoring period, the second time block of the second monitoring period being non-adjacent to a first time block of the second monitoring period. A time block of each scheduled sub-monitoring period may be determined based at least in part on one or more of an identification of the D2D source and a D2D subframe number.

In a fourth illustrative set of examples, a non-transitory computer-readable medium storing computer-executable code for wireless communication is provided. The code may be executable by a processor to: determine a synchronization cycle that may include one or more D2D synchronization signals transmitted on a periodic schedule from a D2D source; determine a monitoring period based at least in part on a start time for at least two sequential transmissions of the D2D synchronization signals occurring during the synchronization cycle based at least in part on the periodic schedule, wherein a duration of the synchronization cycle may include a plurality of monitoring periods; determine, based at least in part on a duration of the monitoring period, a plurality of sub-monitoring periods, wherein a cumulative duration of the plurality of sub-monitoring periods is the same as the duration of the monitoring period; and monitor, based at least in part on the plurality of sub-monitoring periods, for at least one of the one or more D2D synchronization signals.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
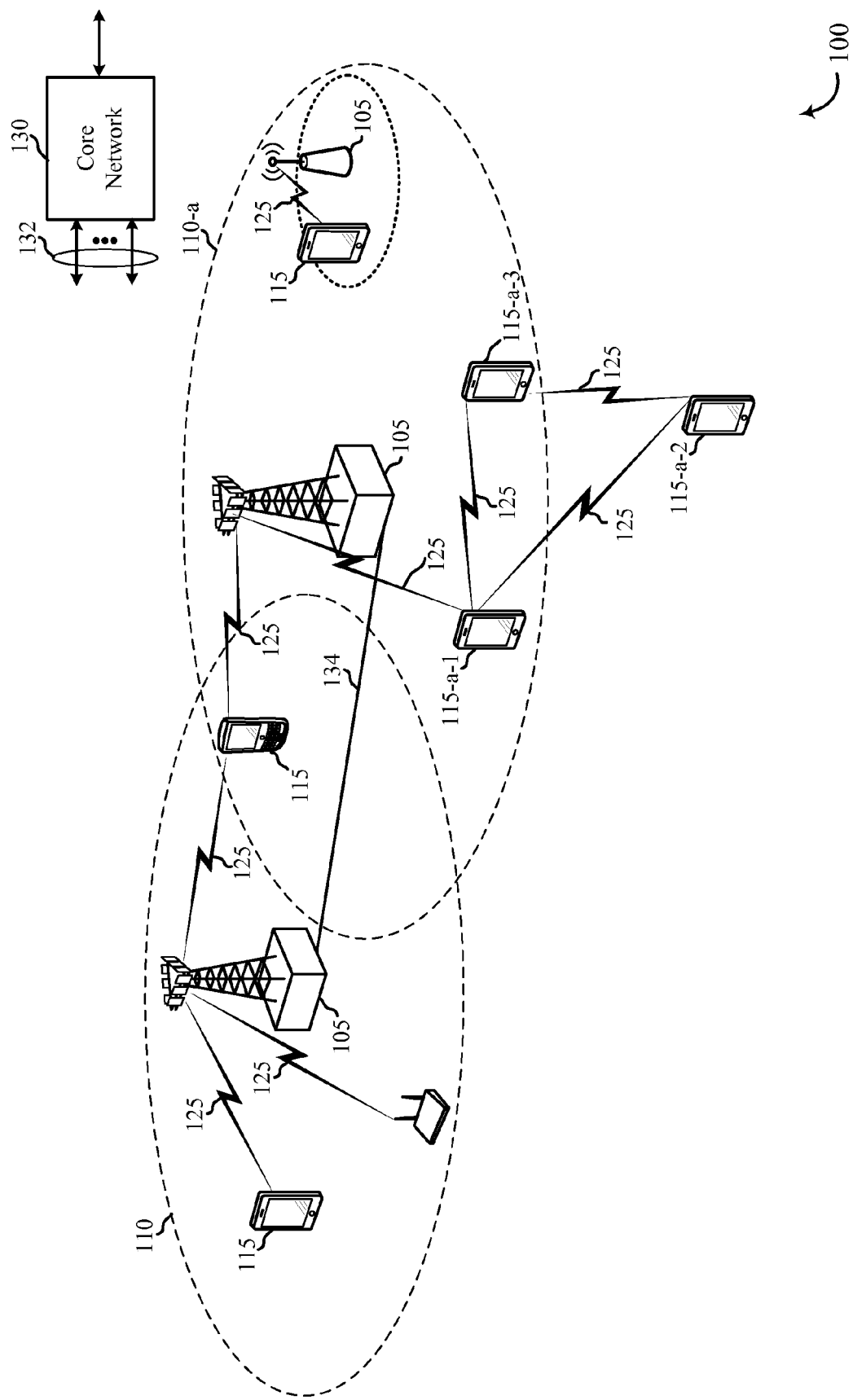
FIG. 1 shows a block diagram of an exemplary wireless communications system in accordance with various embodiments.

Features generally relating to one or more improved systems, methods, and/or apparatuses for determining a monitoring scheme for device-to-device synchronization signal (D2DSS) are described. A device may determine sub-monitoring periods that are configured to detect at least one D2DSS transmission during a synchronization cycle. The sub-monitoring periods may have a cumulative duration the same as a monitoring period, but be scheduled to occur during a portion or all of several monitoring periods occurring during the synchronization cycle. As such, the sub-monitoring periods may provide for detection of a D2DSS transmission during the synchronization cycle without interrupting other operations on the device for the continuous duration of the monitoring period.

In some examples, the device may determine the synchronization cycle for one or more source devices sending the D2DSS transmissions. A source device may send the D2DSS on a periodic schedule that is known, e.g., all devices communicating via D2D communications may send D2DSS according to a shared schedule. The device may determine a monitoring period, e.g., based on a start time for at least two sequential transmissions of the D2DSS. The duration of the synchronization cycle may include several monitoring periods, e.g., 10 monitoring periods per synchronization cycle, continuing with the above example. The device may determine a number of sub-monitoring periods to monitor for at least one of the D2DSS transmissions from the source device. The number and/or duration of the sub-monitoring periods may be based on the monitoring periods, e.g., the cumulative duration of the plurality of sub-monitoring periods may be the same as the duration of the monitoring period. Continuing with the example above, the device may determine that there will be ten sub-monitoring periods of 10 millisecond duration, five sub-monitoring periods of 20 millisecond duration, etc. Accordingly, the device may monitor for the D2DSS transmissions during the sub-monitoring periods with less interruption to other services or activities, e.g., 10 millisecond monitoring period instead of a longer monitoring period.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 illustrates an example of a wireless communications system 100 in accordance with various embodiments. The wireless communications system 100 includes base stations 105, communication devices, also known as a user equipment (UE) 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The wireless communications system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. Wireless communication links 125 may also be established between UEs 115 in a configuration known as D2D communication.

The base stations 105 may wirelessly communicate with the UEs 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area. The wireless communications system 100 may include base stations 105 of different types (e.g., macro, micro, and/or pico base stations). There may be overlapping coverage areas for different technologies.

The wireless communications system 100 may be a Heterogeneous LTE/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The wireless communication links 125 shown in wireless communications system 100 may include uplink (UL) transmissions from a UE 115 to a base station 105, and/or downlink (DL) transmissions, from a base station 105 to a UE 115 over DL carriers. They may also represent D2D communication links. The downlink transmissions may also be called forward link transmissions while the uplink transmissions may also be called reverse link transmissions.

The UEs 115 are dispersed throughout the wireless communications system 100, and each UE may be stationary or mobile. A UE 115 may communicate with other UEs 115 using D2D communications. One or more of a group of UEs (for example, a first UE 115-*a*-1) utilizing D2D communications may be within a coverage area 110-*a* of a cell. Other UEs (for example a second UE 115-*a*-2 and a third UE 115-*a*-3) in such a group may be outside the coverage area 110-*a* of the cell, or otherwise unable to receive transmissions from a base station 105. One or more of the group of UEs may be asynchronous due to, for example, a second UE 115-*a*-2 being outside the coverage area 110-*a* (i.e., associated with a different base station) and/or being associated with a different service carrier provider. One or more of the group of UEs 115-*a* communicating via D2D communications may initially utilize D2D synchronization signals to permit the other UEs 115-*a* to discover and synchronize, e.g., to detect the presence of a first UE 115-*a*-1 and/or to synchronize timing signals between the UEs 115-*a*. In some cases, each UE 115-*a* communicating via D2D communications may send a D2DSS on a recurring schedule to permit other UEs 115-*a* to perform the detection and synchronization function. In some examples, the other UEs may be required to cease other activities (e.g., data communications, transmitting their own D2DSS, etc.) while monitoring for the source UE's D2DSS. This may result in an extended service interruption and a loss of communications.

According to aspects of the present disclosure, a UE 115 may determine a monitoring schedule to monitor for D2DSS from other UEs communicating via D2D communications that reduces the interruption period. In some aspects, the UE 115 may determine a cycle associated with the source UE sending D2DSS on a recurring schedule. The UE 115 may determine a monitoring period that, for example, has a duration covering a start time for at least two sequential transmissions of D2DSS that occur during the synchronization cycle. The synchronization cycle may include a time period that includes several monitoring periods. As one example, a synchronization cycle may be one (1) second (s) and include ten (10) monitoring periods associated with D2DSS being sent for 10 milliseconds every 100 milliseconds. Accordingly, a monitoring period may have a duration of at least 100 milliseconds. Synchronization cycles and/or monitoring periods having other durations and periodic scheduling may also be determined.

The UE 115 may also determine sub-monitoring periods based on the duration of the monitoring periods. As one example, the UE 115 may break the duration of the monitoring period into a number of sub-monitoring periods where the cumulative duration of each of the sub-monitoring periods is the same as a monitoring period. The UE 115 may schedule and monitor according to the sub-monitoring periods for the D2DSS transmissions from the source UE. In some aspects, the UE may schedule the sub-monitoring periods where the sub-monitoring periods occur during different monitoring periods of the synchronization cycle.

Figure 2:
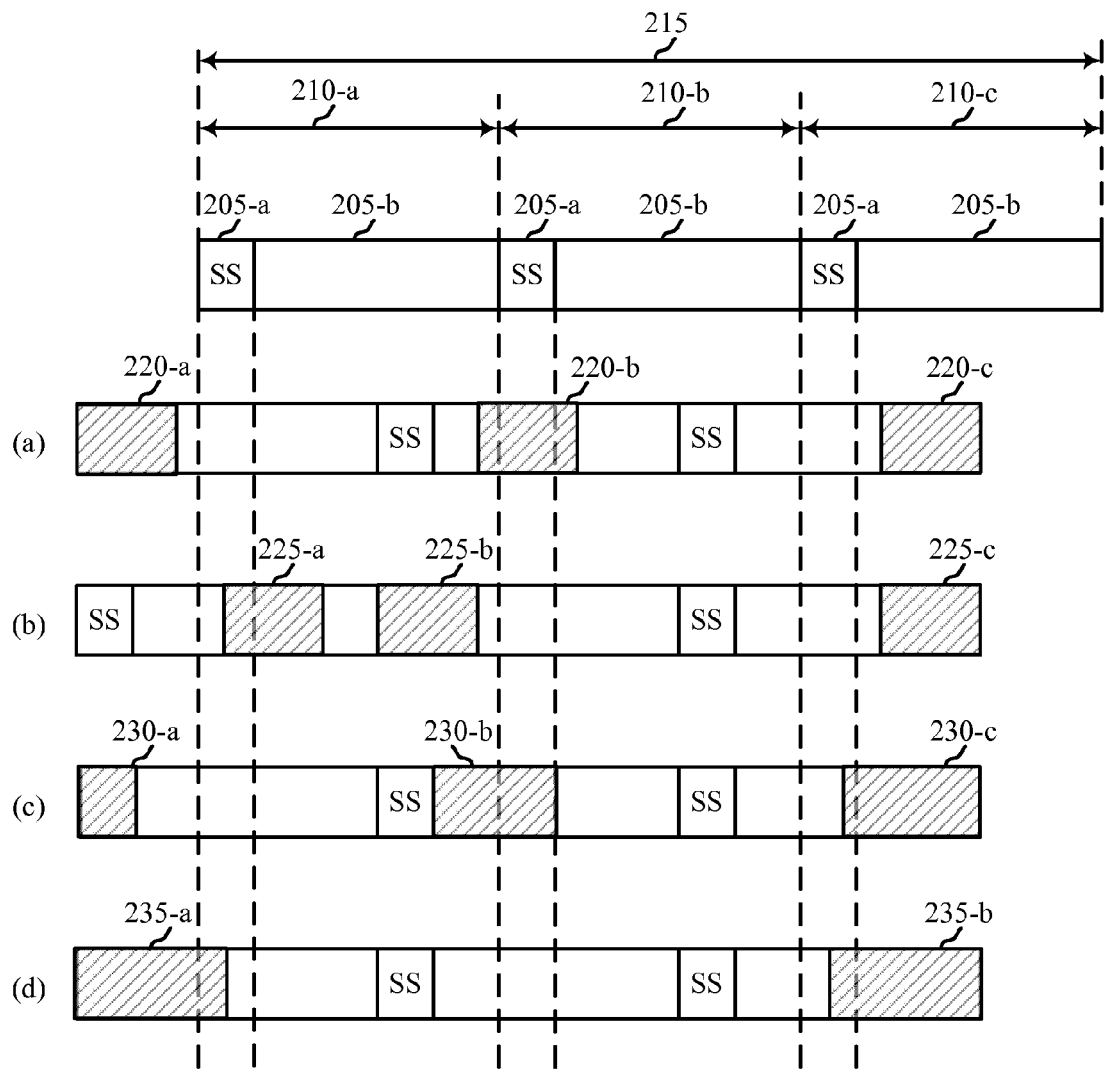
FIG. 2 shows exemplary timing diagrams for various monitoring schemes for D2DSS in a wireless communications system in accordance with various embodiments.

FIG. 2 shows exemplary timing diagrams 200 for various monitoring schemes for D2DSS in a wireless communications system in accordance with various embodiments. The timing diagrams 200 may illustrate aspects of the wireless communications system 100 described with reference to FIG. 1. In some embodiments, one or more of the UEs 115 described with reference to FIG. 1 may execute functionality to implement aspects of the timing diagrams 200. In some examples, the timing diagrams 200 may illustrate aspects of a source UE sending D2DSS transmissions during a monitoring cycle and example monitoring schemes utilizing sub-monitoring periods to detect at least one of the D2DSS transmissions.

A source UE may send a D2DSS 205-*a* followed by a period 205-*b* associated with typical discovery and/or communication activities. The period between start times of sequential D2DSS 205-*a* transmissions may be considered a monitoring period 210 and a synchronization cycle 215 may include multiple monitoring periods 210. Although FIG. 2 shows three monitoring periods 210 occurring during the synchronization cycle 215, it is to be understood that more or less monitoring periods 210 may be included in a synchronization cycle 215. Timing diagrams 200 illustrates, by way of example, four schemes for monitoring for a D2DSS 205-*a* during sub-monitoring periods, labeled as monitoring schemes (a)-(d) for ease of reference.

In some examples, a discovering UE may determine the synchronization cycle 215 and the monitoring period 210. For example, the UE may know a priori and/or receive one or more messages from a serving cell including information indicative of the synchronization cycle 215 and/or the monitoring period 210. In some examples, a UE communicating via D2D communications may send the D2DSS according to a schedule that is known to the other UEs. Therefore, the discovering UE may know the frequency for the D2DSS but may need to perform the discovery/synchronization procedures to synchronize the timing signals for D2D communications. That is, at least some of the UEs participating in the D2D communications may, initially at least, be asynchronous with respect to each other.

In the first exemplary monitoring scheme (a), the discovering UE may determine the plurality of sub-monitoring periods 220 based on the monitoring period 210. In the first exemplary monitoring scheme (a), the discovering UE may schedule at least one of the plurality of sub-monitoring periods 220 to occur during each monitoring period 210 during the synchronization cycle 215. As shown in FIG. 2, each of the plurality of sub-monitoring periods 220-*a*, 220-*b*, and 220-*c* are scheduled during a different monitoring period 210. Additionally, each of the plurality of sub-monitoring periods 220 are scheduled sequentially. That is, the first sub-monitoring period 220-*a* is schedule during a first time block of a first monitoring period 210-*a*, the second sub-monitoring period 220-*b* is scheduled during a second time block of a second monitoring period 210-*b*, etc. The UE may refrain from sending its D2DSS transmission during the first sub-monitoring period 220-*a*. The second time block of the second monitoring period 210-*b* may be adjacent to a first time block of the second monitoring period, i.e., the first sub-monitoring period 220-*a* may occur during a first portion of the first monitoring period 210-*a*, the second sub-monitoring period 220-*b* may occur during a second portion of the second monitoring period 210-*b*, and so on. Accordingly, the discovering UE may monitor for the D2DSS during the sub-monitoring periods 220 that are spread across different monitoring periods 210, but still cover the entire duration of a single monitoring period 210, in order to ensure detection of the D2DSS. In the monitoring scheme (a), the discovering UE may detect the D2DSS from the source UE during the second sub-monitoring period 220-*b*.

The second exemplary monitoring scheme (b) is similar to the first monitoring scheme (a) in that the discovering UE schedules the sub-monitoring periods 225 to occur during each monitoring period 210 during the synchronization cycle 215. However, in the second monitoring scheme (b), the sub-monitoring periods 225 are scheduled non-sequentially. That is, a first sub-monitoring period 225-*a* is scheduled during a second time block of a first monitoring period 210-*a*, and a second sub-monitoring period 225-*b* is scheduled during a first time block of a second monitoring period 210-*b*. That is, the first sub-monitoring period 225-*a* may occur during a second portion of the first monitoring period 210-*a*, the second sub-monitoring period 225-*b* may occur during a first portion of the second monitoring period 210-*b*, and the third sub-monitoring period 225-*c* may occur during a third portion of the third monitoring period 210-*c*. The UE may refrain from sending its D2DSS transmission during the second sub-monitoring period 225-*b*. Accordingly, the discovering UE may monitor for the D2DSS during the sub-monitoring periods 225 that are spread non-sequentially across different monitoring periods 210, but still cover the entire duration of a single monitoring period 210, in order to ensure detection of the D2DSS. In the monitoring scheme (b), the discovering UE may detect the D2DSS from the source UE during the first sub-monitoring period 225-*a*.

In some aspects, the time block of each scheduled sub-monitoring period 220 and/or 225 may be determined based at least in part on an identification of the D2D source and/or a D2D subframe number.

The third exemplary monitoring scheme (c) illustrates aspects where the sub-monitoring periods 230 have different durations. That is, while the first monitoring scheme (a) and the second monitoring scheme (b) illustrate the sub-monitoring periods 220 and 225, respectively, having the same length, the third monitoring scheme (c) illustrates aspects where the discovering UE determines the sub-monitoring periods 230 such that the first sub-monitoring period 230-a has a different length or duration than the second sub-monitoring period 230-b. As such, the discovering UE may adjust the length of the sub-monitoring periods 230 based on other considerations, e.g., network load, priority user traffic, etc.

The fourth exemplary monitoring scheme (d) illustrates aspects where the sub-monitoring periods 235 are scheduled to occur during a portion, but not all, of the monitoring periods 210 occurring during the synchronization cycle 215. As shown in FIG. 2, the first sub-monitoring period 235-a may occur during the first time block of the first monitoring period 210-a, no monitoring may occur during the second monitoring period 210-b, and the second sub-monitoring period 235-b may occur during a second time block of the third monitoring period 210-c. The UE would refrain from sending its D2DSS transmission during the first sub-monitoring period 235-a. In some aspects, the discovering UE may schedule the sub-monitoring periods 235 to occur during the same monitoring periods 210 for each synchronization cycle 215. In other aspects, the discovering UE may schedule the sub-monitoring periods 235 to occur during different monitoring periods 210 for each synchronization cycle 215. In some aspects, the discovering UE may determine the time block for each scheduled sub-monitoring periods 235 based on an identification of the D2D source and/or a D2D subframe number.

Figure 3:
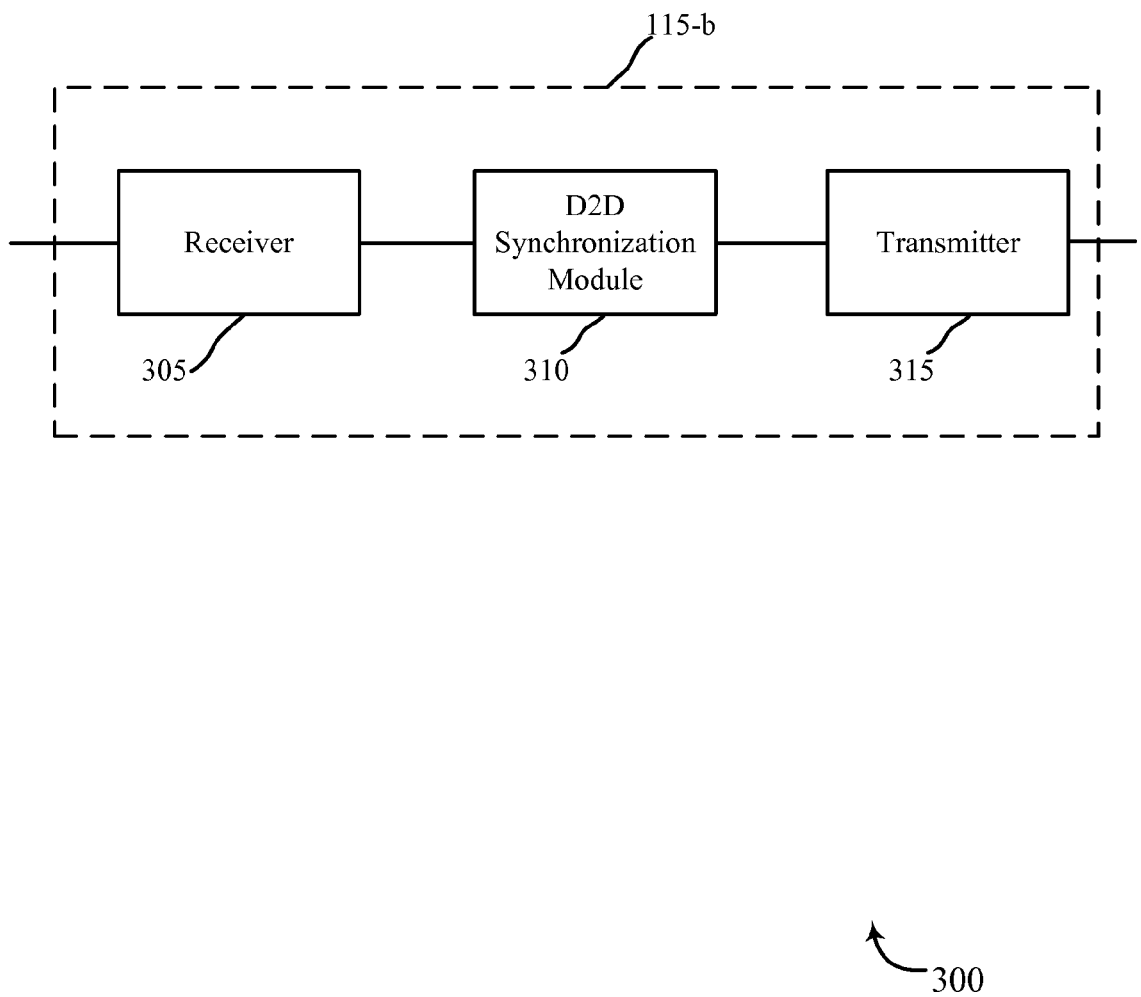
FIG. 3 shows a block diagram of an example of a wireless device for monitoring for D2DSS in accordance with various embodiments.

FIG. 3 shows a block diagram 300 of a UE 115-b for D2D communications in accordance with various embodiments. The UE 115-b may be an example of one or more aspects of a UE 115 described with reference to FIG. 1. The UE 115-b may include a receiver 305, a D2D synchronization module 310, and/or a transmitter 315. The UE 115-b may also include a processor. Each of these components may be in communication with each other.

The components of the UE 115-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 305 may receive information such as packets, user data, and/or control information associated with various information channels (e.g., control channels, data channels, etc.). For example, the receiver 305 may receive one or more D2DSS from a source UE. The D2DSS may be received via an uplink resource assigned for D2DSS transmissions. In some aspects, a physical device-to-device shared channel (PD2DSCH) may be defined and/or otherwise used to send additional synchronization information in conjunction with D2DSS transmissions. The D2DSS from the source UE may be received for D2D communications detection and synchronization. The receiver 305, either alone or in combination with the D2D synchronization module 310, may be means for determining a monitoring schedule for D2DSS.

The D2D synchronization module 310 may identify or otherwise determine a synchronization cycle associated with a source UE communicating via D2D communications. The synchronization cycle periodic schedule may be known, e.g., fixed for UEs communicating via D2D communications. However, the source UE and the UE 115-b may not be within the same serving cell, may be associated with different service providers, and/or may otherwise not be time synchronized. To detect the source UE, the D2D synchronization module 310 may identify or otherwise determine a monitoring period for D2DSS transmissions from the source UE. The monitoring periods may, for example, be a period of time between a start time for two sequential transmissions of D2DSS. The monitoring period may indicate the amount of time the UE 115-b may otherwise monitor for the D2DSS transmissions to detect at least one transmission. In some examples, the D2D synchronization module 310 may randomly select an amount of time as the synchronization cycle based on a known monitoring period duration, e.g., monitoring period×Y, where Y is a positive integer.

The D2D synchronization module 310 further may be configured to identify or otherwise determine sub-monitoring periods based on the duration of the monitoring period. That is, the cumulative duration of the sub-monitoring periods may be the same as a monitoring period. For example, for a 100 millisecond monitoring period, the D2D synchronization module 310 may identify five, 20 millisecond sub-monitoring periods. The D2D synchronization module 310 may schedule the sub-monitoring periods and monitor for the D2DSS from the source UE according to the schedule. The schedule may include a sub-monitoring period occurring during different monitoring periods of the synchronization cycle. Continuing with the above example, a first sub-monitoring period may be scheduled for 0-19 millisecond period of a first monitoring period, a second sub-monitoring period may be scheduled for the 20-39 period of a second monitoring period, etc. The sub-monitoring periods may be scheduled sequentially (as described above) or non-sequentially. Additionally, the sub-monitoring periods may have different lengths for different monitoring periods. The D2D synchronization module 310 may be the means for determining monitoring schedules for D2DSS transmissions for D2D communications.

The transmitter 315 may transmit the one or more signals received from other components of the UE 115-b. For example, the transmitter 315 may transmit D2DSS from the UE 115-b to allow the UE 115-b to be detected and/or to synchronize with other UEs communicating via D2D communications. In some embodiments, the transmitter 315 may be collocated with the receiver 305 in a transceiver module. The transmitter 315 may include a single antenna, or it may include a plurality of antennas.

Figure 4:
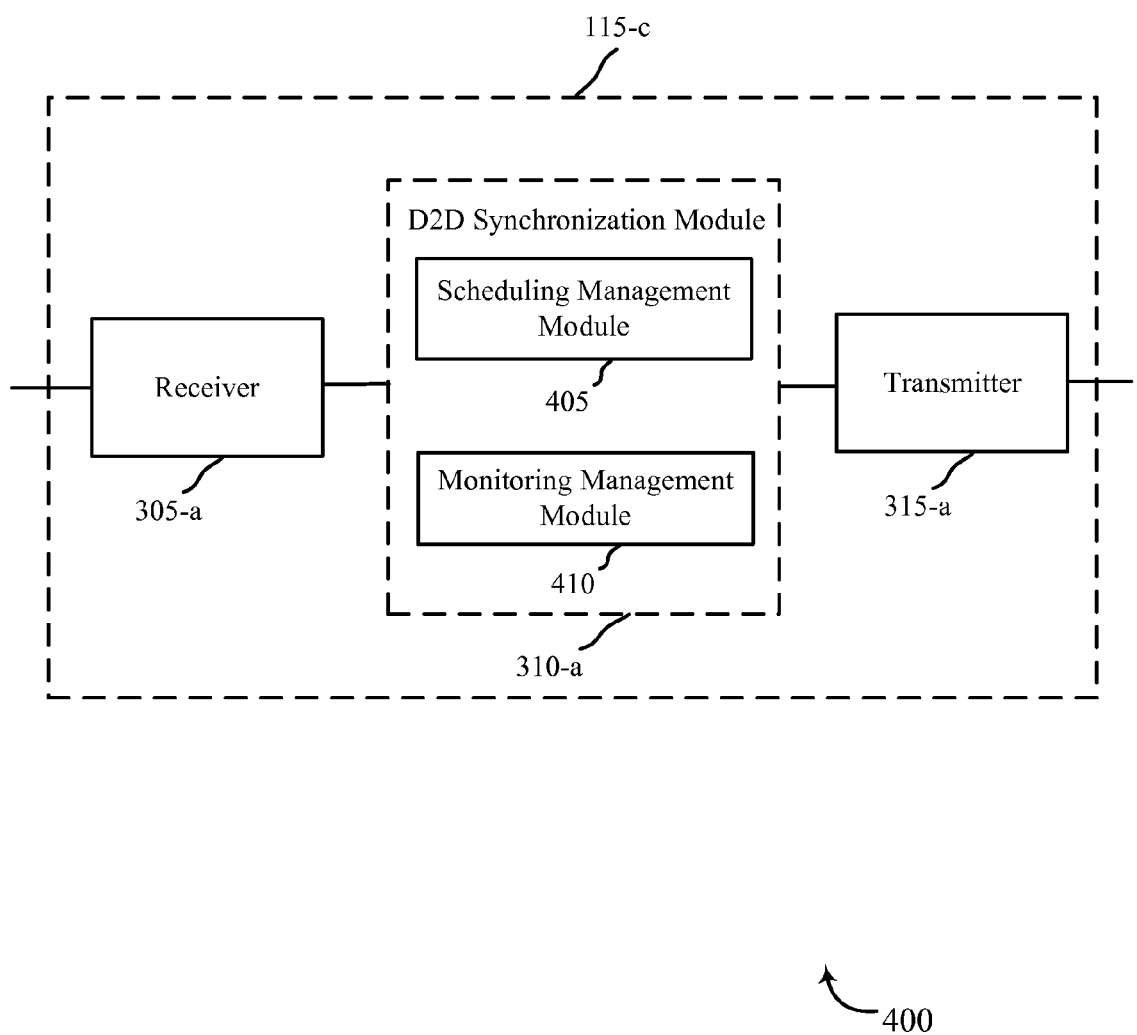
FIG. 4 shows a block diagram of an example of a wireless device for monitoring for D2DSS in accordance with various embodiments.

FIG. 4 shows a block diagram 400 of a UE 115-c for D2D communications in accordance with various embodiments. The UE 115-c may be an example of one or more aspects of a UE 115 described with reference to FIG. 1. The UE 115-c may include a receiver 305-a, a D2D synchronization module 310-a, and/or a transmitter 315-a. The UE 115-c may also include a processor. Each of these components may be in communication with each other.

The components of the UE 115-c may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver 305-a may receive information such as packets, user data, and/or control information associated with various information channels (e.g., control channels, data channels, etc.). For example, the receiver 305-a may receive one or more D2DSS from a source UE. The D2DSS may be received via an uplink resource assigned for D2DSS transmissions. In some aspects, a PD2DSCH may be defined and/or otherwise used to send additional synchronization information in conjunction with D2DSS transmissions. The D2DSS from the source UE may be received for D2D communications detection and synchronization. The receiver 305-a, either alone or in combination with the D2D synchronization module 310-a, may be means for determining a monitoring schedule for D2DSS.

The D2D synchronization module 310-a may be an example of the D2D synchronization module 310 discussed regarding FIG. 3 and may include a scheduling management module 405 and a monitoring management module 410. The scheduling management module 405 may identify or otherwise determine a synchronization cycle associated with a source UE communicating via D2D communications. The scheduling management module 405 may identify or otherwise determine a monitoring period for D2DSS transmissions from the source UE. The monitoring periods may, for example, be a period of time between a start time for two sequential transmissions of D2DSS and may indicate the amount of time the UE 115-c may otherwise monitor for the D2DSS transmissions to detect at least one transmission. In some examples, the scheduling management module 405 may randomly select an amount of time as the synchronization cycle based on a known monitoring period duration, e.g., (monitoring period×Y), where Y is a positive integer. As an example, the scheduling management module 405 may know, a priori, that UEs participating in D2D communications may send D2DSS transmissions for the first 5 milliseconds of each 200 millisecond period. Accordingly, the monitoring period may be 200 milliseconds and the scheduling management module 405 may choose five as the number of monitoring periods to include in a synchronization cycle, i.e., 1 second.

The scheduling management module 405 further may be configured to identify or otherwise determine sub-monitoring periods based on the duration of the monitoring period. The cumulative duration of the sub-monitoring periods may be the same as a monitoring period. Continuing with the above example, for a 200 millisecond monitoring period, the scheduling management module 405 may identify five, 40 millisecond sub-monitoring periods. The scheduling management module 405 may schedule the sub-monitoring periods to occur over the five monitoring periods to ensure detection of the D2DSS without a full 200 millisecond interruption in other activities.

The monitoring management module 410 may be in communication with the scheduling management module 405 and monitor for the D2DSS from the source UE according to the scheduled sub-monitoring periods. The monitoring management module 410 may be in communication with the receiver 305-a to receive one or more D2DSS transmissions from the source UE during the scheduled sub-monitoring period. The D2D synchronization module 310-a may be the means for determining monitoring schedules for D2DSS transmissions for D2D communications, e.g., one or more of the monitoring schemes (a)-(d) described above with respect to FIG. 2.

The transmitter 315-a may transmit the one or more signals received from other components of the UE 115-c. For example, the transmitter 315-a may transmit D2DSS from the UE 115-c to allow the UE 115-c to be detected and/or to synchronize with other UEs communicating via D2D communications. In some embodiments, the transmitter 315-a may be collocated with the receiver 305-a in a transceiver module. The transmitter 315-a may include a single antenna, or it may include a plurality of antennas.

Figure 5:
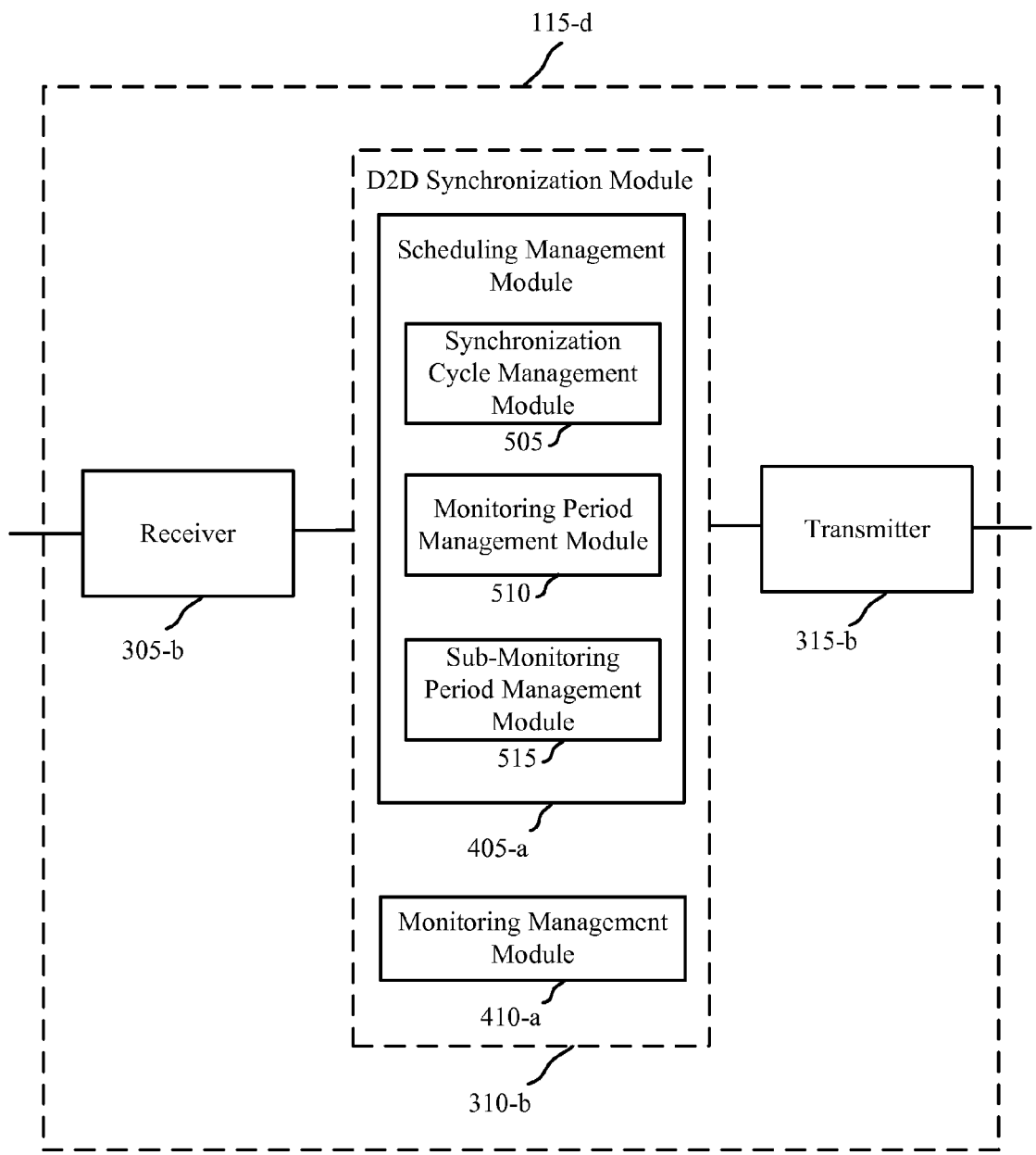
FIG. 5 shows a block diagram of an example of a wireless device for monitoring for D2DSS in accordance with various embodiments.

FIG. 5 shows a block diagram 500 of a UE 115-d for D2D communications in accordance with various embodiments. The UE 115-d may be an example of one or more aspects of a UE 115 described with reference to FIG. 1. The UE 115-d may include a receiver 305-b, a D2D synchronization module 310-b, and/or a transmitter 315-b. The UE 115-d may also include a processor. Each of these components may be in communication with each other.

The components of the UE 115-d may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver 305-b may receive information such as packets, user data, and/or control information associated with various information channels (e.g., control channels, data channels, etc.). For example, the receiver 305-b may receive one or more D2DSS from a source UE. The D2DSS may be received via an uplink resource assigned for D2DSS transmissions. In some aspects, a PD2DSCH may be defined and/or otherwise used to send additional synchronization information in conjunction with D2DSS transmissions. The D2DSS from the source UE may be received for D2D communications detection and synchronization. The receiver 305-b, either alone or in combination with the D2D synchronization module 310-b, may be means for determining a monitoring schedule for D2DSS.

The D2D synchronization module 310-b may be an example of the D2D synchronization module 310 discussed regarding FIG. 3 or 4 and may include a scheduling management module 405-a and a monitoring management module 410-a. The scheduling management module 405-a may include a synchronization cycle management module 505, a monitoring period management module 510, and a sub-monitoring period management module 515. The synchronization cycle management module 505 may identify or otherwise determine a synchronization cycle associated with a source UE communicating via D2D communications. The synchronization cycle management module 505 may communicate with the monitoring period management module 510 to determine the periodic schedule for D2DSS from the source UE and determine the synchronization cycle based on the duration of the monitoring period. The monitoring period management module 510 may identify or otherwise determine a monitoring period for D2DSS transmissions from the source UE. The monitoring periods may, for example, be a period of time between a start time for two sequential transmissions of D2DSS and may indicate the amount of time the UE 115-d may otherwise monitor for the D2DSS transmissions to detect at least one transmission. The monitoring period management module 510 may know, a priori, that UEs participating in D2D communications may send D2DSS transmissions on a known periodic schedule. In other examples, the UE 115-d may receive one or more messages from a serving cell (or via a serving cell from another entity) including information indicative of the periodic schedule for D2DSS transmission for D2D communications. In some examples, the UE 115-d may still desire to detect and synchronize with the source UE via the D2DSS to establish D2D communications.

The sub-monitoring period management module 515 may be configured to identify or otherwise determine sub-monitoring periods based on the duration of the monitoring period. The cumulative duration of the sub-monitoring periods may be the same as a duration of a monitoring period. The sub-monitoring period management module 515 may schedule the sub-monitoring periods to occur over the monitoring periods occurring during a synchronization cycle to ensure detection of the D2DSS without an interruption in other activities for the duration of the monitoring period.

The monitoring management module 410-a may be in communication with the scheduling management module 405-a and monitor for the D2DSS from the source UE according to the scheduled sub-monitoring periods. The monitoring management module 410-a may be in communication with the receiver 305-b to receive one or more D2DSS transmissions from the source UE during the scheduled sub-monitoring period. The D2D synchronization module 310-b may be the means for determining monitoring schedules for D2DSS transmissions for D2D communications, e.g., one or more of the monitoring schemes (a)-(d) described above with respect to FIG. 2.

The transmitter 315-b may transmit the one or more signals received from other components of the UE 115-d. For example, the transmitter 315-b may transmit D2DSS from the UE 115-d to allow the UE 115-d to be detected and/or to synchronize with other UEs communicating via D2D communications. In some embodiments, the transmitter 315-b may be collocated with the receiver 305-b in a transceiver module. The transmitter 315-b may include a single antenna, or it may include a plurality of antennas.

Figure 6:
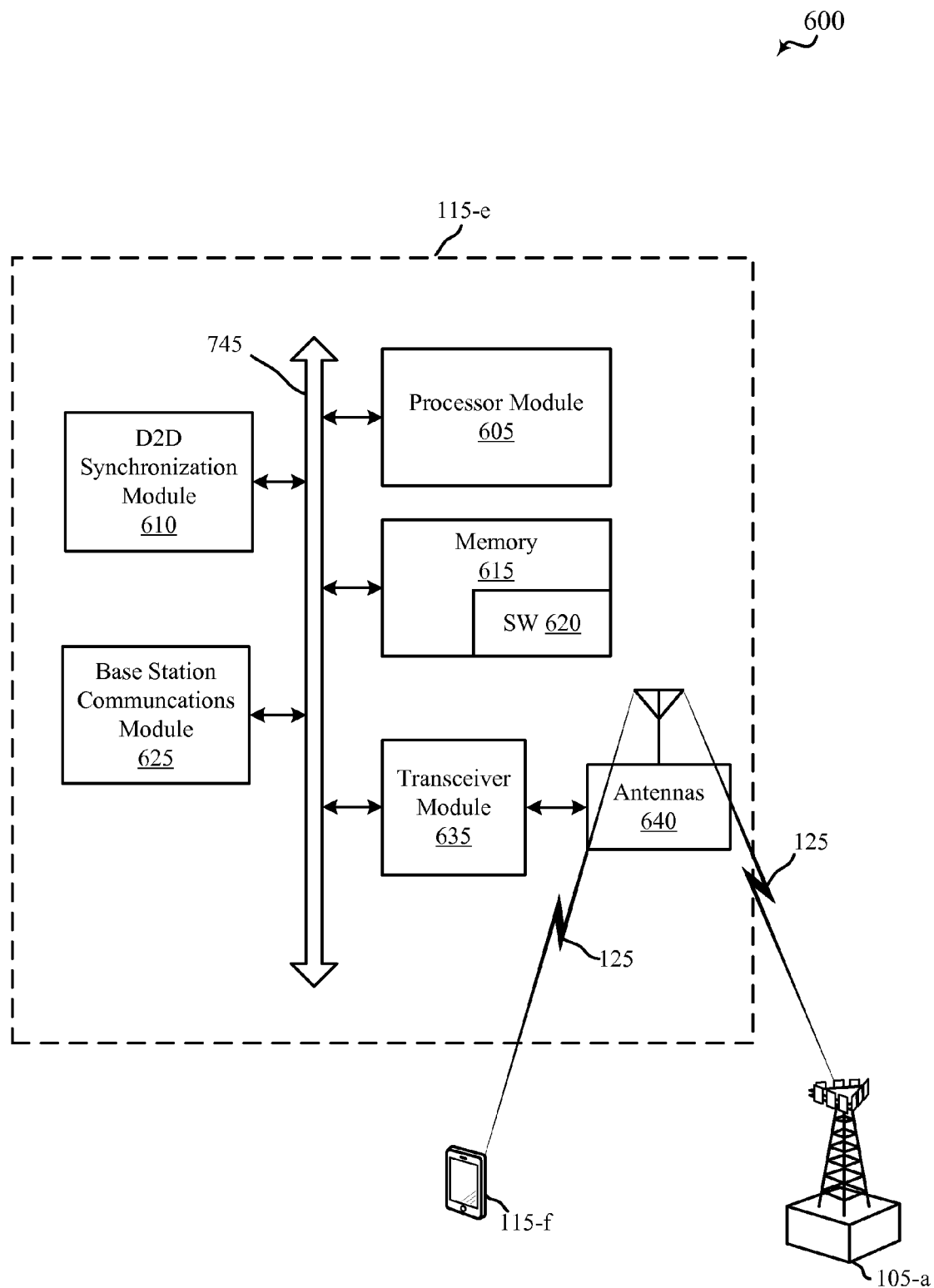
FIG. 6 shows a block diagram of an example of a wireless device for monitoring for D2DSS in accordance with various embodiments.

FIG. 6 shows a diagram of a system 600 for D2D communications in accordance with various embodiments. System 600 may include a UE 115-e, which may be an example of a UE 115 with reference to FIGS. 1, 3, 4, and/or 5. The UE 115-f may be a source UE and may include components for bi-directional voice and data communications including components for transmitting communications and components for receiving communications.

The UE 115-e may include antenna(s) 640, a transceiver module 635, a processor module 605, and memory 615 (including software (SW) 620), which each may communicate, directly or indirectly, with each other (e.g., via one or more buses 645). The transceiver module 635 may be configured to communicate bi-directionally, via the antenna(s) 640 and/or one or more wired or wireless links, with one or more networks, as described above. For example, the transceiver module 635 may be configured to communicate bi-directionally with a base station 105-a and/or with the UE 115-f. The transceiver module 635 may include a modem configured to modulate packets and provide the modulated packets to the antenna(s) 640 for transmission, and to demodulate packets received from the antenna(s) 640. While the UE 115-e may include a single antenna 640, the UE 115-e may also have multiple antennas 640 capable of concurrently transmitting and/or receiving multiple wireless transmissions. The transceiver module 635 may also be capable of concurrently communicating with one or more base stations 105. The base station communications module 625 may perform operations related to such communications with one or more base stations.

The memory 615 may include random access memory (RAM) and read-only memory (ROM). The memory 615 may store computer-readable, computer-executable software/firmware code 620 containing instructions that are configured to, when executed, cause the processor module 605 to perform various functions described herein (e.g., call processing, database management, processing of monitoring period management, module management, etc.). Alternatively, the software/firmware code 620 may not be directly executable by the processor module 605 but be configured to cause a computer (e.g., when compiled and executed) to perform functions described herein. The processor module 605 may include an intelligent hardware device, e.g., a central processing unit (CPU), a microcontroller, an ASIC, etc.

The D2D synchronization module 610 may be configured to identify or otherwise determine a monitoring scheme for detecting D2DSS transmissions from a source UE (e.g., UE 115-f) and perform operations related to D2DSS detection and synchronization as discussed above with respect to FIGS. 1-5. If UE 115-f is a source D2D transmitting device, for example, the D2D synchronization module 610 may determine a cycle associated with the source UE 115-f sending D2DSS on a recurring schedule. The D2D synchronization module 610 may determine a monitoring period that may have a duration covering a start time for at least two sequential transmissions of D2DSS that occur during the synchronization cycle. The synchronization cycle may include a time period that includes several monitoring periods. The D2D synchronization module 610 may also determine sub-monitoring periods based on the duration of the monitoring periods. As one example, the D2D synchronization module 610 may divide the duration of the monitoring period into a number of sub-monitoring periods where the cumulative duration of each of the sub-monitoring periods is the same as a monitoring period. The D2D synchronization module 610 may schedule and monitor according to the sub-monitoring periods for the D2DSS from the source UE 115-f. In some aspects, the D2D synchronization module 610 may schedule the sub-monitoring periods to occur during different monitoring periods of the synchronization cycle. Thus, the D2D synchronization module 610 may be configured to perform operations to carry out the various functions described above with respect to FIGS. 1, 3, 4, and/or 5. The D2D synchronization module 610 may be an example of the D2D synchronization modules 310 described with respect to FIGS. 2-5.

Figure 7:
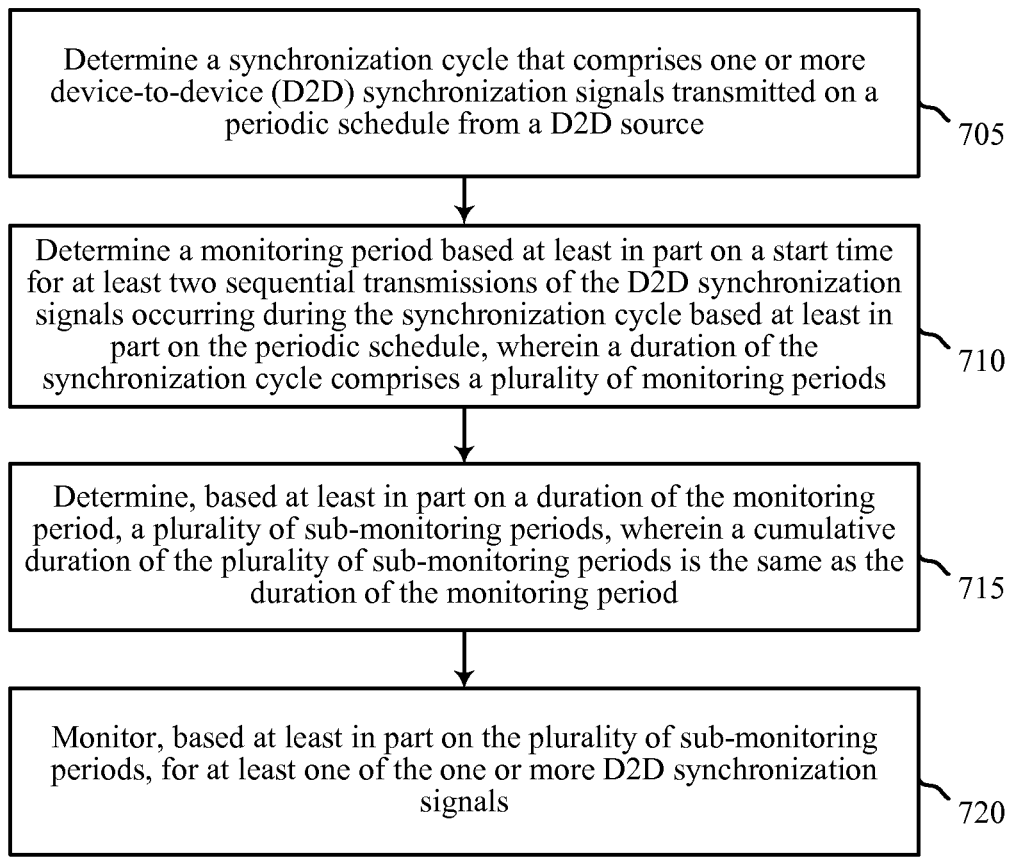
FIGS. 7-9 show flowchart of illustrative methods for wireless communications, according to various embodiments.

FIG. 7 shows a flowchart 700 illustrating a method for wireless communications, such as D2D communications, in accordance with various embodiments. The functions of flowchart 700 may be implemented by a system device, such as a UE 115 or its components as described with reference to FIGS. 1, 3, 4, 5, and/or 6. In some examples, a system device, such as one of the UEs 115, may execute one or more sets of codes to control the functional elements of the device to perform the functions described below.

At block 705, a synchronization cycle is determined that comprises one or more D2D synchronization signals transmitted on a periodic schedule from a D2D source. The synchronization cycle may be known, may be signaled via one or more messages from a serving cell, and/or determined based on a duration of a monitoring period. At block 710, a monitoring period may be determined based at least in part on a start time for at least two sequential transmissions of the D2D synchronization signals occurring during the synchronization cycle based at least in part on the periodic schedule. The synchronization cycle comprises a plurality of monitoring periods. The monitoring period may, for example, be a time period sufficient to detect at least one D2DSS transmission.

At block 715, a plurality of sub-monitoring periods may be determined, based at least in part on a duration of the monitoring period, wherein a cumulative duration of the plurality of sub-monitoring periods is the same as the duration of the monitoring period. For example, the length of the monitoring periods may be divided into smaller sub-monitoring periods that can be scheduled during different monitoring periods of the synchronization cycle. At block 720, monitoring, based at least in part on the sub-monitoring periods, for at least one of the one or more D2D synchronization signals. The sub-monitoring periods may be scheduled to occur over different monitoring periods of the synchronization cycle. The sub-monitoring periods may have the same length or may have a different length. Additionally, the sub-monitoring periods may be scheduled sequentially or non-sequentially over the monitoring periods.

It should be noted that the method of flowchart 700 is just one implementation and that the operations of the method may be rearranged or otherwise modified such that other implementations are possible.

Figure 8:
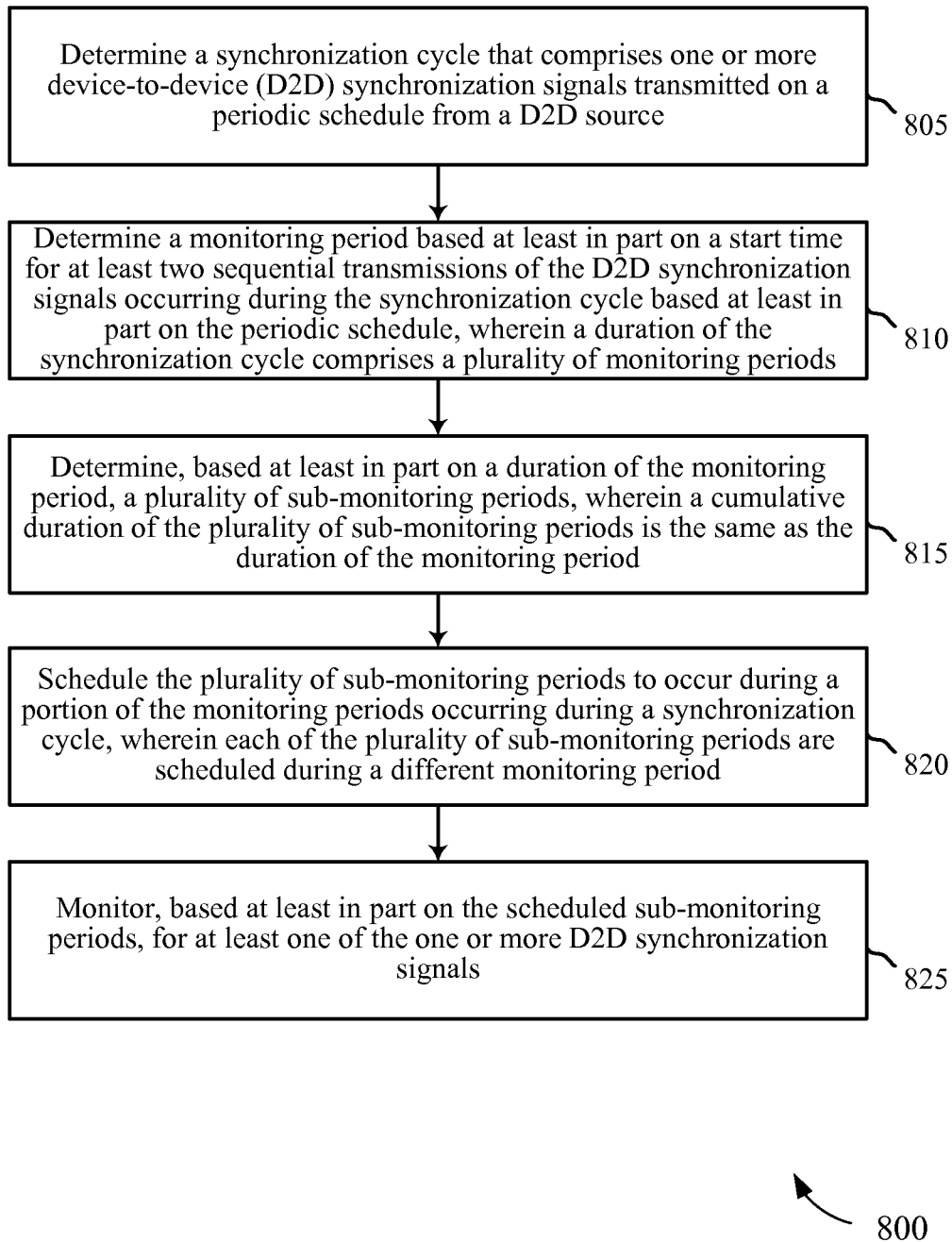

FIG. 8 shows a flowchart 800 illustrating a method for wireless communications, such as D2D communications, in accordance with various embodiments. The functions of flowchart 800 may be implemented by a system device, such as a UE 115 or its components as described with reference to FIGS. 1, 3, 4, 5, and/or 6. In some examples, a system device, such as one of the UEs 115, may execute one or more sets of codes to control the functional elements of the device to perform the functions described below.

At block 805, a synchronization cycle is determined that comprises one or more D2D synchronization signals transmitted on a periodic schedule from a D2D source. The synchronization cycle may be known, may be signaled via one or more messages from a serving cell, and/or determined based on a duration of a monitoring period. At block 810, a monitoring period may be determined based at least in part on a start time for at least two sequential transmissions of the D2D synchronization signals occurring during the synchronization cycle based at least in part on the periodic schedule. The synchronization cycle may comprise a plurality of monitoring periods. The monitoring period may, for example, be a time period sufficient to detect at least one D2DSS transmission.

At block 815, a plurality of sub-monitoring periods may be determined, based at least in part on a duration of the monitoring period, wherein a cumulative duration of the plurality of sub-monitoring periods is the same as the duration of the monitoring period. For example, the length of the monitoring periods may be divided into smaller sub-monitoring periods that can be scheduled during different monitoring periods of the synchronization cycle. At block 820, the plurality of sub-monitoring periods may be scheduled to occur during a portion of the monitoring periods occurring during a synchronization cycle, wherein each of the plurality of sub-monitoring periods are scheduled during a different monitoring period. For instance, a first sub-monitoring period may occur during a first monitoring period of the synchronization cycle and a second monitoring period may occur during a fourth monitoring period of the synchronization cycle. Accordingly, some of the monitoring periods occurring during a synchronization cycle may not include a scheduled sub-monitoring period.

At block 825, monitoring, based at least in part on the sub-monitoring periods, for at least one of the one or more D2D synchronization signals. The sub-monitoring periods may be scheduled to occur over different monitoring periods of the synchronization cycle. The sub-monitoring periods may have the same length or may have a different length. Additionally, the sub-monitoring periods may be scheduled sequentially or non-sequentially over the monitoring periods.

It should be noted that the method of flowchart 800 is just one implementation and that the operations of the method may be rearranged or otherwise modified such that other implementations are possible.

Figure 9:
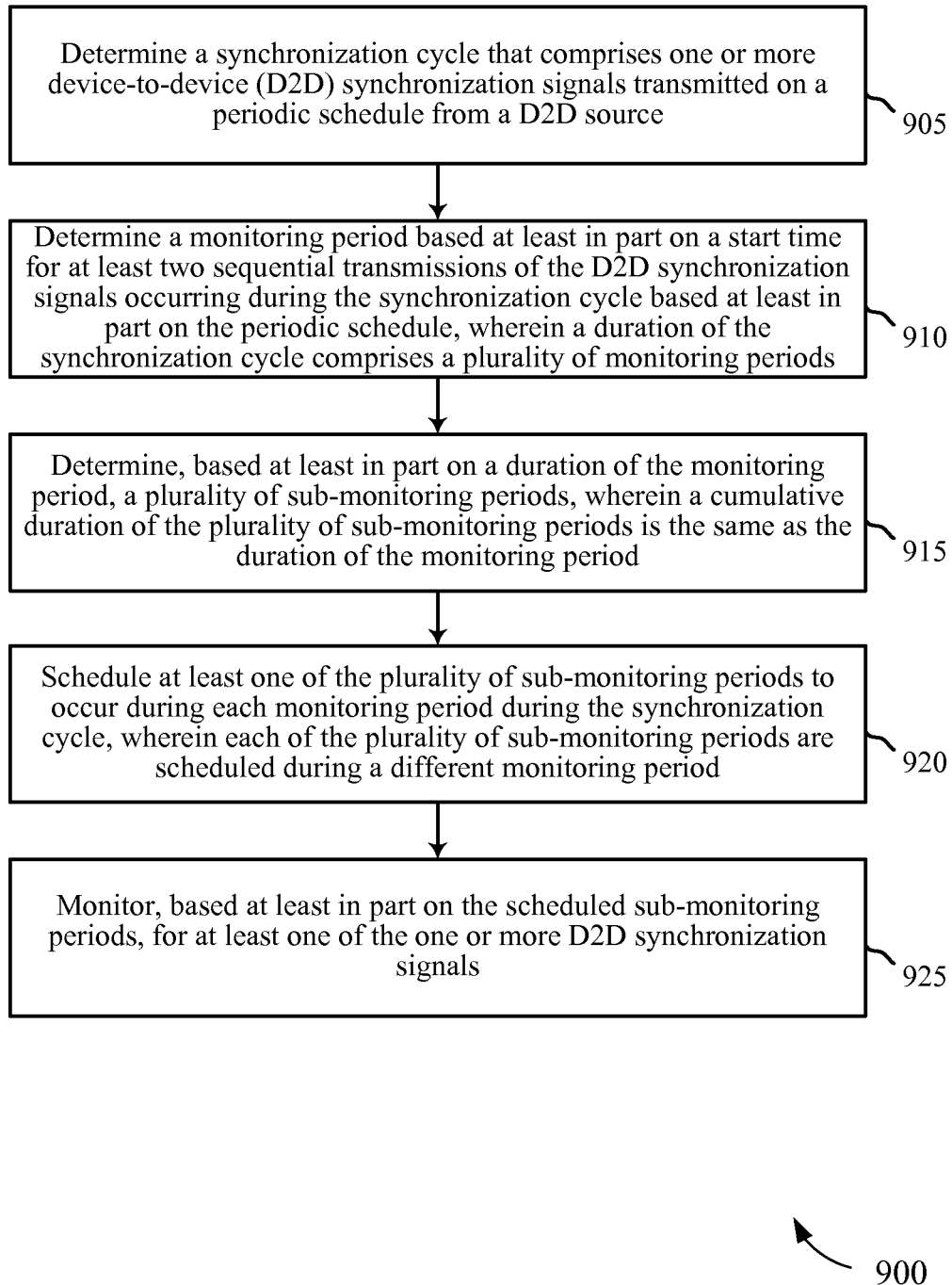

FIG. 9 shows a flowchart 900 illustrating a method for wireless communications, such as D2D communications, in accordance with various embodiments. The functions of flowchart 900 may be implemented by a system device, such as a UE 115 or its components as described with reference to FIGS. 1, 3, 4, 5, and/or 6. In some examples, a system device, such as one of the UEs 115, may execute one or more sets of codes to control the functional elements of the device to perform the functions described below.

At block 905, a synchronization cycle is determined that comprises one or more D2D synchronization signals transmitted on a periodic schedule from a D2D source. The synchronization cycle may be known, may be signaled via one or more messages from a serving cell, and/or determined based on a duration of a monitoring period. At block 910, a monitoring period may be determined based at least in part on a start time for at least two sequential transmissions of the D2D synchronization signals occurring during the synchronization cycle based at least in part on the periodic schedule. The synchronization cycle comprises a plurality of monitoring periods. The monitoring period may, for example, be a time period sufficient to detect at least one D2DSS transmission.

At block 915, a plurality of sub-monitoring periods may be determined, based at least in part on a duration of the monitoring period, wherein a cumulative duration of the plurality of sub-monitoring periods is the same as the duration of the monitoring period. For example, the length of the monitoring periods may be divided into smaller sub-monitoring periods that can be scheduled during different monitoring periods of the synchronization cycle. At block 920, at least one of the plurality of sub-monitoring periods may be scheduled to occur during each monitoring period during the synchronization cycle, wherein each of the plurality of sub-monitoring periods are scheduled during a different monitoring period. That is, each monitoring period of the synchronization cycle may include at least one scheduled sub-monitoring period. In some aspects, each of the sub-monitoring periods scheduled during its associated monitoring period may occur during a different time block. In one example, the sub-monitoring periods may be scheduled sequentially where a first sub-monitoring period occurs during a first time block of the first monitoring period and a second sub-monitoring period is scheduled to occur during a second time block of the second monitoring period. The sub-monitoring periods may also be scheduled non-sequentially.

At block 925, monitoring, based at least in part on the sub-monitoring periods, for at least one of the one or more D2D synchronization signals may be performed. The sub-monitoring periods may be scheduled to occur over different monitoring periods of the synchronization cycle. The sub-monitoring periods may have the same length or may have a different length.

It should be noted that the method of flowchart 900 is just one implementation and that the operations of the method may be rearranged or otherwise modified such that other implementations are possible.

The detailed description set forth above in connection with the appended drawings describes exemplary embodiments and does not represent the only embodiments that may be implemented or that are within the scope of the claims. The term "example" or "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The terms "device" and "apparatus" may be used interchangeably.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   determining a synchronization cycle that comprises one or more device-to-device (D2D) synchronization signals transmitted on a periodic schedule from a D2D source;
   determining a monitoring period based at least in part on a start time for at least two sequential transmissions of the D2D synchronization signals occurring during the synchronization cycle based at least in part on the periodic schedule, wherein a duration of the synchronization cycle comprises a plurality of monitoring periods;
   determining, based at least in part on a duration of the monitoring period, a plurality of sub-monitoring periods, wherein a cumulative duration of the plurality of sub-monitoring periods is the same as the duration of the monitoring period; and monitoring, based at least in part on the plurality of sub-monitoring periods, for at least one of the one or more D2D synchronization signals.

2. The method of claim 1, wherein each of the plurality of sub-monitoring periods comprises a sub-monitoring duration, each sub-monitoring duration being the same length.

3. The method of claim 1, wherein each of the plurality of sub-monitoring periods comprises a sub-monitoring duration, at least two of sub-monitoring durations being a different length.

4. The method of claim 1, wherein determining the plurality of sub-monitoring periods comprises:
scheduling the plurality of sub-monitoring periods to occur during a portion of the plurality of monitoring periods occurring during the synchronization cycle, wherein each of the plurality of sub-monitoring periods are scheduled during a different monitoring period.

5. The method of claim 4, wherein the plurality of sub-monitoring periods are scheduled during different monitoring periods for each synchronization cycle.

6. The method of claim 4, wherein the plurality of sub-monitoring periods are scheduled during the same monitoring periods for each synchronization cycle.

7. The method of claim 4, wherein a time block of each scheduled sub-monitoring period is determined based at least in part on one or more of an identification of the D2D source and a D2D subframe number.

8. The method of claim 1, wherein determining the plurality of sub-monitoring periods comprises:
scheduling at least one of the plurality of sub-monitoring periods to occur during each monitoring period during the synchronization cycle, wherein each of the plurality of sub-monitoring periods are scheduled during a different monitoring period.

9. The method of claim 8, wherein each of the plurality of sub-monitoring periods is scheduled sequentially.

10. The method of claim 9, wherein scheduling the plurality of sub-monitoring periods sequentially comprises:
scheduling a first sub-monitoring period during a first time block of a first monitoring period; and
scheduling a second sub-monitoring period during a second time block of a second monitoring period, the second time block of the second monitoring period being adjacent to a first time block of the second monitoring period.

11. The method of claim 8, wherein each of the plurality of sub-monitoring periods is scheduled non-sequentially.

12. The method of claim 11, wherein scheduling the plurality of sub-monitoring periods non-sequentially comprises:
scheduling a first sub-monitoring period during a first time block of a first monitoring period; and
scheduling a second sub-monitoring period during a second time block of a second monitoring period, the second time block of the second monitoring period being non-adjacent to a first time block of the second monitoring period.

13. The method of claim 8, wherein a time block of each scheduled sub-monitoring period is determined based at least in part on one or more of an identification of the D2D source and a D2D subframe number.

14. An apparatus for wireless communications, comprising:
a processor:
memory in electronic communication with the processor; and instructions being stored in the memory, the instructions being executable by the processor to:
determine a synchronization cycle that comprises one or more device-to-device (D2D) synchronization signals transmitted on a periodic schedule from a D2D source;
determine a monitoring period based at least in part on a start time for at least two sequential transmissions of the D2D synchronization signals occurring during the synchronization cycle based at least in part on the periodic schedule, wherein a duration of the synchronization cycle comprises a plurality of monitoring periods;
determine, based at least in part on a duration of the monitoring period, a plurality of sub-monitoring periods, wherein a cumulative duration of the plurality of sub-monitoring periods is the same as the duration of the monitoring period; and
monitor, based at least in part on the plurality of sub-monitoring periods, for at least one of the one or more D2D synchronization signals.

15. The apparatus of claim 14, wherein each of the plurality of sub-monitoring periods comprises a sub-monitoring duration, each sub-monitoring duration being the same length.

16. The apparatus of claim 14, wherein each of the plurality of sub-monitoring periods comprises a sub-monitoring duration, at least two of sub-monitoring durations being a different length.

17. The apparatus of claim 14, wherein the instructions to determine the plurality of sub-monitoring periods are further executable by the processor to:
schedule the plurality of sub-monitoring periods to occur during a portion of the plurality of monitoring periods occurring during the synchronization cycle, wherein each of the plurality of sub-monitoring periods are scheduled during a different monitoring period.

18. The apparatus of claim 17, wherein the plurality of sub-monitoring periods are scheduled during different monitoring periods for each synchronization cycle.

19. The apparatus of claim 17, wherein the plurality of sub-monitoring periods are scheduled during the same monitoring periods for each synchronization cycle.

20. The apparatus of claim 17, wherein a time block of each scheduled sub-monitoring period is determined based at least in part on one or more of an identification of the D2D source and a D2D subframe number.

21. The apparatus of claim 14, wherein the instructions to determine the plurality of sub-monitoring periods are further executable by the processor to:
schedule at least one of the plurality of sub-monitoring periods to occur during each monitoring period during the synchronization cycle, wherein each of the plurality of sub-monitoring periods are scheduled during a different monitoring period.

22. The apparatus of claim 21, wherein each of the plurality of sub-monitoring periods is scheduled sequentially.

23. The apparatus of claim 22, wherein the instructions to schedule the plurality of sub-monitoring periods sequentially are further executable by the processor to:
schedule a first sub-monitoring period during a first time block of a first monitoring period; and
schedule a second sub-monitoring period during a second time block of a second monitoring period, the second time block of the second monitoring period being adjacent to a first time block of the second monitoring period.

24. The apparatus of claim 21, wherein each of the plurality of sub-monitoring periods is scheduled non-sequentially.

25. The apparatus of claim 24, wherein the instructions to schedule the plurality of sub-monitoring periods non-sequentially are further executable by the processor to:
schedule a first sub-monitoring period during a first time block of a first monitoring period; and
schedule a second sub-monitoring period during a second time block of a second monitoring period, the second time block of the second monitoring period being non-adjacent to a first time block of the second monitoring period.

26. The apparatus of claim 21, wherein a time block of each scheduled sub-monitoring period is determined based at least in part on one or more of an identification of the D2D source and a D2D subframe number.

27. A apparatus for wireless communications, comprising:
means for determining a synchronization cycle that comprises one or more device-to-device (D2D) synchronization signals transmitted on a periodic schedule from a D2D source;
means for determining a monitoring period based at least in part on a start time for at least two sequential transmissions of the D2D synchronization signals occurring during the synchronization cycle based at least in part on the periodic schedule, wherein a duration of the synchronization cycle comprises a plurality of monitoring periods;
means for determining, based at least in part on a duration of the monitoring period, a plurality of sub-monitoring periods, wherein a cumulative duration of the plurality of sub-monitoring periods is the same as the duration of the monitoring period; and
means for monitoring, based at least in part on the plurality of sub-monitoring periods, for at least one of the one or more D2D synchronization signals.

28. The apparatus of claim 27, wherein each of the plurality of sub-monitoring periods comprises a sub-monitoring duration, each sub-monitoring duration being the same length.

29. The apparatus of claim 27, wherein each of the plurality of sub-monitoring periods comprises a sub-monitoring duration, at least two of sub-monitoring durations being a different length.

30. A non-transitory computer-readable medium storing computer-executable code for wireless communication, the code executable by a processor to:
determine a synchronization cycle that comprises one or more device-to-device (D2D) synchronization signals transmitted on a periodic schedule from a D2D source;
determine a monitoring period based at least in part on a start time for at least two sequential transmissions of the D2D synchronization signals occurring during the synchronization cycle based at least in part on the periodic schedule, wherein a duration of the synchronization cycle comprises a plurality of monitoring periods;
determine, based at least in part on a duration of the monitoring period, a plurality of sub-monitoring periods, wherein a cumulative duration of the plurality of sub-monitoring periods is the same as the duration of the monitoring period; and
monitor, based at least in part on the plurality of sub-monitoring periods, for at least one of the one or more D2D synchronization signals.

* * * * *